United States Patent
Galvan et al.

(10) Patent No.: US 9,914,826 B2
(45) Date of Patent: Mar. 13, 2018

(54) PROPYLENE-BASED COPOLYMER COMPOSITION FOR PIPES

(71) Applicant: BASELL POLIOLEFINE ITALIA S.R.L., Milan (IT)

(72) Inventors: Monica Galvan, Ferrara (IT); Andreas Neumann, Ferrara (IT); Sandro Bolognesi, Ferrara (IT); Francesca Tisi, Ferrara (IT); Giampaolo Pellegatti, Ferrara (IT)

(73) Assignee: Basell Poliolefine Italia S.r.l., Milan (IT)

( * ) Notice: Subject to any disclaimer, the term of this patent is extended or adjusted under 35 U.S.C. 154(b) by 0 days.

(21) Appl. No.: 15/328,845

(22) PCT Filed: Jun. 29, 2015

(86) PCT No.: PCT/EP2015/064684
§ 371 (c)(1),
(2) Date: Jan. 24, 2017

(87) PCT Pub. No.: WO2016/012199
PCT Pub. Date: Jan. 28, 2016

(65) Prior Publication Data
US 2017/0210894 A1    Jul. 27, 2017

(30) Foreign Application Priority Data
Jul. 25, 2014  (EP) .................... 14178473

(51) Int. Cl.
*B29D 22/00* (2006.01)
*C08L 23/14* (2006.01)
*B32B 1/08* (2006.01)
*B32B 7/12* (2006.01)
*B32B 15/085* (2006.01)
*B32B 27/20* (2006.01)
*F16L 9/12* (2006.01)

(52) U.S. Cl.
CPC ............. *C08L 23/14* (2013.01); *B32B 1/08* (2013.01); *B32B 7/12* (2013.01); *B32B 15/085* (2013.01); *B32B 27/20* (2013.01); *F16L 9/12* (2013.01); *B32B 2264/10* (2013.01); *B32B 2597/00* (2013.01); *C08L 2203/18* (2013.01); *C08L 2205/025* (2013.01)

(58) Field of Classification Search
CPC ................. C08L 23/14; C08L 2203/18; C08L 2205/025; B32B 27/20; B32B 15/085; B32B 7/12; B32B 1/08; B32B 2264/10; B32B 2597/00; F16L 9/12
See application file for complete search history.

(56) References Cited

U.S. PATENT DOCUMENTS

2005/0165171 A1   7/2005   Pelliconi et al.
2008/0090969 A1   4/2008   Pelliconi et al.

FOREIGN PATENT DOCUMENTS

| CN | 1639250 A | 7/2005 |
| CN | 103524903 A | 1/2014 |
| EP | 1724289 A1 | 11/2006 |
| EP | 2361950 A1 | 8/2011 |

OTHER PUBLICATIONS

International Search Report and Written Opinon dated Sep. 14, 2015 for Corresponding PCT/EP2015/064684.

*Primary Examiner* — James C Yager

(57) ABSTRACT

A polyolefin composition made from or containing (A) from 90.0 to 99.0 wt % of a first propylene ethylene copolymer wherein (i) the ethylene derived units is between 1.0 and 8.0 wt %; (ii) the melting temperature ranges from 135 to 155° C.; (iii) the melt flow rate (230° C./5 kg ISO 1133) ranges from 0.2 to 3.5 g/10 min; (iv) the xylene solubles at 25° C. ranges from 10.0 to 4.0 wt %; (v) the polydispersity index ranges from 3.0 to 7.0; and (B) from 1.0 to 10.0 wt % of a second propylene ethylene copolymer (i) containing from 8.0 to 20.0 wt % of ethylene derived units; and having a MFR (measured at 190° C. 2.16 kg of load) between 0.5 and 5.0 g/10 min, wherein (a) the resulting polyolefin composition has a melt flow rate (230° C./5 kg ISO 1133) ranging from 0.2 to 4.0 g/10 min and (b) the sum A+B being 100.

8 Claims, No Drawings

US 9,914,826 B2

PROPYLENE-BASED COPOLYMER COMPOSITION FOR PIPES

This application is the U.S. National Phase of PCT International Application PCT/EP2015/064684, filed Jun. 29, 2015, claiming benefit of priority to European Patent Application No. 14178473.6, filed Jul. 25, 2014, the contents of which are incorporated herein by reference in its entirety.

FIELD OF THE INVENTION

In general, the present disclosure relates to the field of chemistry. More specifically, the present disclosure relates to polymer chemistry. In particular, the present disclosure relates to a composition made from or containing a propylene ethylene copolymer and an heterophasic propylene ethylene copolymer as well as pressure pipes for low temperature applications made therefrom.

BACKGROUND OF THE INVENTION

Propylene ethylene copolymers are useful for the production of pipes.

When small diameter pipes are needed, limited wall thickness of the pipe is desirable. However, when the wall thickness becomes small, the pipe could become brittle; thus, it is necessary to use a material having high impact resistance.

It is desirable to provide a propylene-based composition that provides impact resistance to pipes. It is further desirable that the impact resistance is achieved at low temperatures.

SUMMARY OF THE INVENTION

In general embodiments, the present disclosure provides a polyolefin composition made from or containing:
  A) from about 90.0 wt % to about 99.0 wt %, based upon the total weight of the polyolefin composition, of a first propylene ethylene copolymer wherein:
    i) the content of ethylene derived units is between about 1.0 wt % and about 8.0 wt %, based upon the total weight of the first copolymer;
    (ii) the melting temperature ranges from about 135° C. to about 155° C.;
    (iii) the melt flow rate (230° C./5 kg ISO 1133) ranges from about 0.2 g/10 min to about 3.5 g/10 min;
    (iv) the xylene solubles at 25° C. ranges from about 10.0 wt % to about 4.0 wt %, based upon the total weight of the first copolymer; and
    (v) the polydispersity index, PI, ranges from about 3.0 to about 7.0; and
  B) from about 1.0 wt % to about 10.0 wt %, based upon the total weight of the polyolefin composition, of a second propylene ethylene copolymer:
    (i) containing from about 8.0 wt % to about 20.0 wt % of ethylene derived units, based upon the total weight of the second copolymer, and
    (ii) having a MFR (measured at 190° C. 2.16 kg of load) between about 0.5 g/10 min and about 5.0 g/10 min;
wherein
(a) the resulting polyolefin composition has a melt flow rate (230° C./5 kg ISO 1133) ranging from about 0.2 g/10 min to about 4.0 g/10 min and
(b) the sum A+B being 100.

While multiple embodiments are disclosed, still other embodiments will become apparent to those skilled in the art from the following detailed description. As will be apparent, certain embodiments, as disclosed herein, are capable of modifications in various obvious aspects, all without departing from the spirit and scope of the claims as presented herein. Accordingly, the detailed description is to be regarded as illustrative in nature and not restrictive.

DETAILED DESCRIPTION OF THE INVENTION

The present invention now will be described more fully hereinafter. However, this invention can be embodied in many different forms and should not be construed as limited to the embodiments set forth herein; rather, these embodiments are provided so that this disclosure will satisfy applicable legal requirements. As such, it will be apparent to those skilled in the art that the embodiments can incorporate changes and modifications without departing from the general scope. It is intended to include all the modifications and alterations in so far as the modifications and alterations come within the scope of the appended claims or the equivalents thereof.

As used in this specification and the claims, the singular forms "a," "an," and "the" include plural referents unless the context clearly dictates otherwise.

As used in this specification and the claims, the terms "comprising," "containing," or "including" mean that at least the named compound, element, material, particle, or method step, etc., is present in the composition, the article, or the method, but does not exclude the presence of other compounds, elements, materials, particles, or method steps, etc., even if the other such compounds, elements, materials, particles, or method steps, etc., have the same function as that which is named, unless expressly excluded in the claims. It is also to be understood that the mention of one or more method steps does not preclude the presence of additional method steps before or after the combined recited steps or intervening method steps between those steps expressly identified.

Moreover, it is also to be understood that the lettering of process steps or ingredients is a means for identifying discrete activities or ingredients and the recited lettering can be arranged in any sequence, unless expressly indicated.

For the purpose of the present description and of the claims which follow, except where otherwise indicated, numbers expressing amounts, quantities, percentages, and so forth, are to be understood as being modified by the term "about". Also, ranges include any combination of the maximum and minimum points disclosed and include any intermediate ranges therein, which may or may not be specifically enumerated herein.

In the present description, the term "first" refers to the order in which a particular species is presented and does not necessarily indicate that a "second" species will be presented. For example, "first polymer composition" refers to the first of at least one polymer composition. The term does not reflect priority, importance, or significance in any other way. Similar terms used that can be used herein include "second," "third," "fourth," etc.

In general embodiments, the present disclosure provides a polyolefin composition made from or containing:
  A) from about 90.0 wt % to about 99.0 wt %, based upon the total weight of the polyolefin composition, of a first propylene ethylene copolymer wherein:

i) the content of ethylene derived units is between about 1.0 wt % and about 8.0 wt %, based upon the total weight of the first copolymer;
(ii) the melting temperature ranges from about 135° C. to about 155° C.;
(iii) the melt flow rate (230° C./5 kg ISO 1133) ranges from about 0.2 g/10 min to about 3.5 g/10 min;
(iv) the xylene solubles at 25° C. ranges from about 10.0 wt % to about 4.0 wt %, based upon the total weight of the first copolymer;
(v) the polydispersity index, PI, ranges from about 3.0 to about 7.0; and
B) from about 1.0 wt % to about 10.0 wt % of a second propylene ethylene copolymer:
(i) containing from about 8.0 wt % to about 20.0 wt % of ethylene derived units, based upon the total weight of the second copolymer; and
(ii) having a MFR (measured at 190° C. 2.16 kg of load) between about 0.5 g/10 min and about 5.0 g/10 min;
wherein
(a) the resulting polyolefin composition has a melt flow rate (230° C./5 kg ISO 1133) ranging from about 0.2 g/10 min to about 4.0 g/10 min and
(b) the sum A+B being 100.

In some embodiments, the first propylene ethylene copolymer is present in an amount from about 92.0 wt % to about 98.0 wt % based upon the total weight of the polyolefin composition. In other embodiments, the first propylene ethylene copolymer is present in an amount from about 94.0 wt % to about 97.0 wt %. In further embodiments, the first propylene ethylene copolymer is present in an amount from about 94.5 wt % to about 97.5 wt %.

In some embodiments, the first propylene ethylene copolymer has the content of ethylene derived units between about 2.0 wt % to about 6.0 wt %, based upon the total weight of the first copolymer. In other embodiments, the content of ethylene derived units is between about 3.0 wt % to about 5.0 wt %.

In some embodiments, the first propylene ethylene copolymer has a melting temperature ranging from about 137° C. to about 148° C.

In some embodiments, the first propylene ethylene copolymer has a melt flow rate ranging from about 0.6 g/10 min to about 2.0 g/10 min.

In some embodiments, the first propylene ethylene copolymer has polydispersity index ranging from about 3.5 to about 6.0. In other embodiments, the polydispersity index is in the range from about 4.0 to about 5.5.

In some embodiments, the second propylene ethylene copolymer is present in an amount from about 2.0 wt % to about 8.0 wt % based upon the total weight of the polyolefin composition. In other embodiments, the second propylene ethylene copolymer is present in an amount from about 3.0 wt % to about 6.0 wt %. In further embodiments, the second propylene ethylene copolymer is present in an amount from about 2.5 wt % to about 5.5 wt %.

In some embodiments, the second propylene ethylene copolymer has the content of ethylene derived units between about 11 wt % to about 19 wt %, based upon the total weight of the first copolymer. In other embodiments, the content of ethylene derived units is between about 13 wt % to about 18 wt %.

In some embodiments, the second propylene ethylene copolymer has a melt flow rate ranging from about 0.8 g/10 min to about 3.0 g/10 min.

In some embodiments, the resulting polyolefin composition has a melt flow rate (230° C./5 kg ISO 1133) ranging from about 0.4 g/10 min to about 3.0 g/10 min. In other embodiments, the resulting polyolefin composition has a melt flow rate from about 0.5 g/10 min to about 2 g/10 min.

In the present description, the term "copolymer" refers to a polymer containing two monomers. In some embodiments, one of the comonomers can be propylene and the other can be ethylene.

The component B) is endowed with one or more of the following features:
i) tensile strength at break (ASTM D638) higher than about 4 MPa;
ii) Elongation at break (ASTM D638) higher than about 1500%;
iii) Flexural modulus (ASTM D 790) ranging from about 5 to about 30 MPa; and
iv) Shore A hardness (ASTM 2240) ranging from about 40 to about 90.

In some embodiments, the elongation at break is higher than about 2000%.

In some embodiments, the flexural modulus is from about 6 to about 17 MPa. In other embodiments, the flexural modulus is from about 8 to about 19 MPa.

In some embodiments, the shore A hardness is from about 50 to about 80. In other embodiments, the shore A hardness is from about 55 to about 75.

With the polyolefin composition provided herein, it is possible to obtain pipes. In some embodiments, the pipes can have small diameters. In other embodiments, those small diameter pipes can have a small wall thickness and be used under pressure.

In the present description, the term "pipe" as used herein also includes pipe fittings, valves and all parts useful in a hot water piping system. The definition includes single and multilayer pipes. In some embodiments, the multilayer pipes can include one or more metal layers or adhesive layers.

Such articles can be manufactured through a variety of industrial processes such as molding, extrusion, and the like.

In some embodiments, the composition further contains or is made from an inorganic filler agent in an amount ranging from about 0.5 to about 60 parts by weight with respect to 100 parts by weight of the composition. Examples of such filler agents are calcium carbonate, barium sulfate, titanium dioxide, and talc. In particular embodiments, the inorganic filler agent is either talc or calcium carbonate.

Some filler agents can have a nucleating effect. When used as a nucleating agent, the filler can be present in an amount from about 0.2 to about 5 wt % based upon the total weight of the polyolefin composition.

The composition can be used for providing pipes with walls of any configuration other than those with smooth inner and outer surface. Examples are pipes with a sandwich-like pipe wall, pipes with a hollow wall construction with longitudinally extending cavities, pipes with a hollow wall construction with spiral cavities, pipes with a smooth inner surface and a compact or hollow, spirally shaped, or an annularly ribbed outer surface, independently of the configuration of the respective pipe ends.

Articles, pressure pipes and related fittings can be prepared by a variety of methods including extrusion or molding.

Extrusion of articles can be made with different type of extruders for polyolefin, including single or twin screw extruders.

In some embodiments, a process is provided wherein the composition is molded into articles.

When the pipes are multi-layer, at least one layer is made of the composition described above. The further layer(s) can be made of an amorphous or a crystalline polymer (such as homopolymer and co- or terpolymer) of R—CH=CH2 olefins, where R is a hydrogen atom or a C1-C6 alkyl radical. Examples of those polymers include:

(a) isotactic or substantially isotactic propylene homopolymers;
(b) random co- and terpolymers of propylene with ethylene and/or C4-C8 α-olefin, such as 1-butene, 1-hexene, 1-octene, 4-methyl-1-pentene, wherein the total comonomer content ranges from about 0.05% to about 20% by weight, based upon the total weight of the propylene-based polymer or mixture of the polymers with isotactic or substantially isotactic propylene homopolymers of (a);
(c) heterophasic polymer blends made from or containing (i) a propylene homopolymer and/or one of the co- and terpolymers of item (b) and (ii) an elastomeric moiety made from or containing co- and terpolymers of ethylene with propylene and/or a C4-C8 α-olefin, optionally containing minor amounts of a diene, the same disclosed for polymer (b); and
(d) amorphous polymers such as fluorinated polymers.

For example, the fluorinated polymer can be polyvinyl difluoride (PVDF).

In multi-layer pipes, the layers of the pipe can have the same or different thickness.

The composition can be prepared by blending component A) and B).

The polymerization of A) can be carried out in the presence of Ziegler-Natta catalysts. A component of the catalysts is a solid catalyst component comprising a titanium compound having at least one titanium-halogen bond, and an electron-donor compound, both supported on a magnesium halide in active form. Another component (co-catalyst) is an organoaluminium compound, such as an aluminium alkyl compound.

An external donor is optionally added.

The catalysts used in the process can be capable of producing polypropylene with a value of xylene insolubility at ambient temperature greater than about 90%, based upon the total weight of the polypropylene. In some embodiments, the value of xylene insolubility can be greater than about 95%.

Suitable catalysts are described in U.S. Pat. Nos. 4,399,054, 4,472,524, and European Patent No. 45977, incorporated herein by reference.

The solid catalyst components used in the catalysts include, as electron-donors (internal donors), compounds selected from the group consisting of ethers, ketones, lactones, compounds containing N, P and/or S atoms, and esters of mono- and dicarboxylic acids.

Suitable electron-donor compounds are esters of phtalic acid and 1,3-diethers of formula:

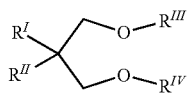

wherein $R^I$ and $R^{II}$ are the same or different and are $C_1$-$C_{18}$ alkyl, $C_3$-$C_{18}$ cycloalkyl or $C_7$-$C_{18}$ aryl radicals; $R^{III}$ and $R^{IV}$ are the same or different and are $C_1$-$C_4$ alkyl radicals; or are the 1,3-diethers in which the carbon atom in position 2 belongs to a cyclic or polycyclic structure made up of 5, 6, or 7 carbon atoms, or of 5-n or 6-n' carbon atoms, and respectively n nitrogen atoms and n' heteroatoms selected from the group consisting of N, O, S and Si, where n is 1 or 2 and n' is 1, 2, or 3, the structure containing two or three unsaturations (cyclopolyenic structure), and optionally being condensed with other cyclic structures, or substituted with one or more substituents selected from the group consisting of linear or branched alkyl radicals; cycloalkyl, aryl, aralkyl, alkaryl radicals and halogens, or being condensed with other cyclic structures and substituted with one or more of the above mentioned substituents that can also be bonded to the condensed cyclic structures; one or more of the above mentioned alkyl, cycloalkyl, aryl, aralkyl, or alkaryl radicals and the condensed cyclic structures optionally containing one or more heteroatom(s) as substitutes for carbon or hydrogen atoms, or both.

Ethers of this type are described in published European Patent Applications Nos. 361493 and 728769, incorporated herein by reference.

Representative examples of the diethers are 2-methyl-2-isopropyl-1,3-dimethoxypropane, 2,2-diisobutyl-1,3-dimethoxypropane, 2-isopropyl-2-cyclopentyl-1,3-dimethoxypropane, 2-isopropyl-2-isoamyl-1,3-dimethoxypropane, 9,9-bis (methoxymethyl) fluorene.

Other suitable electron-donor compounds are phthalic acid esters, such as diisobutyl, dioctyl, diphenyl and benzylbutyl phthalate.

The preparation of the catalyst component is carried out according to various methods.

For example, a MgCl2.nROH adduct (in the form of spheroidal particles) wherein n is from 1 to 3 and ROH is ethanol, butanol or isobutanol, is reacted with an excess of TiCl4 containing the electron-donor compound. The reaction temperature is from 80 to 120° C. The solid is then isolated and reacted once more with TiCl4, in the presence or absence of the electron-donor compound, after which it is separated and washed with aliquots of a hydrocarbon until all chlorine ions have disappeared.

In the solid catalyst component, the titanium compound, expressed as Ti, is present in an amount from about 0.5 to about 10% by weight, based upon the total weight of the solid catalyst component. The quantity of electron-donor compound which remains fixed on the solid catalyst component can be about 5 to about 20% by moles with respect to the magnesium dihalide.

The titanium compounds, which can be used for the preparation of the solid catalyst component, are the halides and the halogen alcoholates of titanium. The titanium compound can be titanium tetrachloride.

The reactions result in the formation of a magnesium halide in active form. Other reactions can cause the formation of magnesium halide in active form starting from magnesium compounds other than halides, such as magnesium carboxylates.

The Al-alkyl compounds used as co-catalysts comprise the Al-trialkyls, such as Al-triethyl, Al-triisobutyl, Al-tri-n-butyl, and linear or cyclic Al-alkyl compounds containing two or more Al atoms bonded to each other by way of O or N atoms, or SO4 or SO3 groups.

The Al-alkyl compound can be used in such a quantity that the Al/Ti ratio be from about 1 to about 1000.

The electron-donor compounds that can be used as external donors include aromatic acid esters such as alkyl benzoates, and silicon compounds containing at least one Si—OR bond, where R is a hydrocarbon radical.

Examples of silicon compounds are (tert-butyl)2Si (OCH3)2, (cyclohexyl)(methyl)Si (OCH3)2, (cyclopentyl)2Si(OCH3)2 and (phenyl)2Si(OCH3)2 and (1,1,2-trimethylpropyl)Si(OCH3)3.

1,3-diethers having the formulae described above can also be used. If the internal donor is one of these diethers, the external donors can be omitted.

The component A) can be prepared by using catalysts containing a phthalate as internal donor and (cyclopentyl)2Si(OCH3)2 as outside donor, or the 1,3-diethers as internal donors.

The Ziegler-Natta catalysts that can be used to produce the propylene polymer is a solid catalyst component made from or containing a magnesium halide, a titanium compound having at least a Ti-halogen bond and at least two electron donor compounds selected from succinates and the other being selected from 1,3 diethers.

Component A) is produced with a polymerization process illustrated in European Patent Application No. 1 012 195.

In detail, the process includes feeding the monomers to the polymerization zones in the presence of catalyst under reaction conditions and collecting the polymer product from the the polymerization zones. In the process, the growing polymer particles flow upward through one (first) of the polymerization zones (riser) under fast fluidization conditions, leave the riser and enter another (second) polymerization zone (downcomer) through which they flow downward in a densified form under the action of gravity, leave the downcomer and are reintroduced into the riser, thus establishing a circulation of polymer between the riser and the downcomer.

In the downcomer, high values of density of the solid are reached, which approach the bulk density of the polymer. A positive gain in pressure can thus be obtained along the direction of flow, so that it becomes possible to reintroduce the polymer into the riser without the help of special mechanical means. In this way, a "loop" circulation is set up, which is defined by the balance of pressures between the two polymerization zones and by the head loss introduced into the system.

The condition of fast fluidization in the riser can be established by feeding a gas mixture comprising the relevant monomers to the riser. The feeding of the gas mixture can be effected below the point of reintroduction of the polymer into the riser by the use, where appropriate, of gas distributor means. The velocity of transport gas into the riser is higher than the transport velocity under the operating conditions, in some instances, from about 2 to about 15 m/s.

The polymer and the gaseous mixture leaving the riser can be conveyed to a solid/gas separation zone. The solid/gas separation can be effected by using conventional separation means. From the separation zone, the polymer enters the downcomer. The gaseous mixture leaving the separation zone is compressed, cooled and transferred, if appropriate with the addition of make-up monomers and/or molecular weight regulators, to the riser. The transfer can be effected by means of a recycle line for the gaseous mixture.

The control of the polymer circulating between the two polymerization zones can be effected by metering the amount of polymer leaving the downcomer using means suitable for controlling the flow of solids, such as mechanical valves.

This first stage process can be carried out under operating pressures of between about 0.5 and about 10 MPa. In other processes, the pressures can be between about 1.5 to about 6 MPa.

One or more inert gases can be maintained in the polymerization zones, in such quantities that the sum of the partial pressure of the inert gases can be between about 5 and about 80% of the total pressure of the gases. The inert gas can be nitrogen or propane, for example.

The various catalysts are fed up to the riser at any point of the riser. However, the catalysts can also be fed at any point of the downcomer. The catalyst can be in any physical state, therefore catalysts in either solid or liquid state can be used.

Component B) can be prepared by using the described catalyst system or by using metallocene based catalyst system. Component B) can be obtained by using gas phase polymerization processes, slurry polymerization processes, or solution polymerization processes.

EXAMPLE

The following examples are included to demonstrate embodiments. It should be appreciated by those of skill in the art that the techniques disclosed in the examples which follow represent techniques discovered to function well, and thus can be considered to constitute exemplary modes of practice. However, those of skill in the art should, in light of the present disclosure, appreciate that many changes can be made in the specific embodiments which are disclosed and still obtain a like or similar result without departing from the spirit and scope of this disclosure.

Characterization Methods

Melting temperature and crystallization temperature: Determined by differential scanning calorimetry (DSC). A sample specimen, weighing 6±1 mg, is heated to 220±1° C. at a rate of 20° C./min and kept at 220±1° C. for 2 minutes in nitrogen stream. It is thereafter cooled at a rate of 20° C./min to 40±2° C., thereby kept at this temperature for 2 min to crystallize the sample. Then, the sample is again fused at a temperature rise rate of 20° C./min up to 220° C.±1. The melting scan is recorded, a thermogram is obtained, and, from this, melting temperatures and crystallization temperatures are read.

Melt Flow Rate: Determined according to the method ISO 1133 (230° C., 5 kg).

Solubility in xylene: Determined by introducing 2.5 g of polymer and 250 ml of xylene into a glass flask equipped with a refrigerator and a magnetic stirrer. The temperature is raised in 30 minutes up to the boiling point of the solvent. The clear solution is then kept under reflux and stirring for further 30 minutes. The closed flask is then kept for 30 minutes in a bath of ice and water and in thermostatic water bath at 25° C. for 30 minutes as well. The solid is filtered on quick filtering paper. 100 ml of the filtered liquid is poured in a pre-weighed aluminum container, which is heated on a heating plate under nitrogen flow, to remove the solvent by evaporation. The container is then kept in an oven at 80° C. under vacuum until constant weight is obtained. The weight percentage of polymer soluble in xylene at room temperature is then calculated.

Ethylene content (C2 content) has been determined by FT-IR spectroscopy. The sample of a pressed film has been prepared according to ASTM D5576-00 (2013).

The spectrum of a pressed film of the polymer is recorded in absorbance vs. wavenumbers (cm-1). The following measurements are used to calculate C2 content:

a) Area (At) of the combination absorption bands between 4482 and 3950 cm-1 which is used for spectrometric normalization of film thickness.

b) Area (AC2) of the absorption band due to methylenic sequences (CH2 rocking vibration) after a proper digital subtraction of an isotactic polypropylene (IPP) reference spectrum. The range 660 to 790 cm-1.

Elongation at yield: measured according to ISO 527.

Elongation at break: measured according to ISO 527

Stress at break: measured according to ISO 527.

Impact test: ISO 180

Samples for the Mechanical Analysis

Samples have been obtained according to ISO 1873-2: 2007 excepting for the flexural modulus for which ISO 3167 has been used.

Flexural Modulus determined according to ISO 178.

Tensile modulus determined according to ISO 527.

Polydispersity Index (PI): Determined at a temperature of 200° C. by using a parallel plates rheometer model RMS-800 marketed by RHEOMETRICS (USA), operating at an oscillation frequency which increases from 0.1 rad/sec to 100 rad/sec. From the crossover modulus one can derive the P.I. by way of the equation:

$$P.I.=105/Gc$$

in which Gc is the crossover modulus which is defined as the value (expressed in Pa) at which G'=G" wherein G' is the storage modulus and G" is the loss modulus.

Component A)

Component A was a commercial random propylene ethylene copolymer sold by LyondellBasell. The properties of the copolymer have been reported in Table 1:

TABLE 1

| Component A | | |
|---|---|---|
| MFR 5 Kg/230° C. | g/10 min | 1.3 |
| C2* | wt % | 4.0 |
| Polydispersity (PI) |  | 4.9 |
| Xylene Solubility | % | 8.7 |
| ISO Characterization | | |
| Flexural modulus 24 h | MPa | 850 |
| Tensile modulus 24 h | MPa | 850 |
| IZOD 0° C. 24 h | kJ/m2 | 19.0 |
| Stress at yield | % | 27 |
| Elongation at break | kJ/m2 | 482 |
| Tm | ° C. | 140 |

*C2 = ethylene derived units

Component B)

Components B) is a commercial propylene-ethylene elastomer. The methods used have been reported in Table 2. The characteristics are reported on Table 2.

TABLE 2

| Propylene content | wt % | 84 |
|---|---|---|
| Ethylene content | wt % | 16 |
| MFR (190° C., 2.16 Kg) | g/10' | 1.4 |
| Tensile Strength at Break (ASTM D 638) | MPa | >6.9 |
| Elongation at Break (ASTM D 638) | % | >2000 |
| Shore A Hardness (ASTM D 2240) | — | 66 |
| Flexural modulus (ASTM D790) | MPa | 12.3 |

Component A and B were blended together at various percentages. The resulting blends were analyzed. The results have been reported on Table 3. C1 is component A alone.

TABLE 3

| | | blend | | |
|---|---|---|---|---|
| | | Ex. 1 | Ex. 2 | |
| | | Component | | |
| | | B | B | C1 |
| Split* | wt % | 2.5 | 4 | 0 |
| MFR | g/10 min | 1.1 | 1.1 | 1.3 |
| Stress at break | % | 30 | 30 | 30 |
| Elongation at break | % | 15 | 15 | 31 |
| Melting point | ° C. | 140 | 140 | 140 |
| Tensile modulus | MPa | 750 | 690 | 830 |
| Flexural modulus | MPa | 780 | 750 | 870 |
| IZOD at 0° | kJ/m2 | 27 | 34 | 19 |

*The remaining amount being component A

What is claimed is:

1. A polyolefin composition comprising:
   A) from about 90.0 wt % to about 99.0 wt %, based upon the total weight of the polyolefin composition, of a first propylene ethylene copolymer wherein:
      i) the content of ethylene derived units is between about 1.0 wt % and 8.0 about wt %, based upon the total weight of the first copolymer;
      (ii) the melting temperature ranges from about 135° C. to about 155° C.;
      (iii) the melt flow rate (230° C./5 kg ISO 1133) ranges from about 0.2 g/10 min to about 3.5 g/10 min;
      (iv) the xylene solubles at 25° C. ranges from about 10.0 wt % to about 4.0 wt %, based upon the total weight of the first copolymer; and;
      (v) the polydispersity index, PI, ranges from about 3.0 to about 7.0; and
   B) from about 1.0 wt % to about 10.0 wt %, based upon the total weight of the polyolefin composition, of a second propylene ethylene copolymer:
      (i) containing from 8.0 wt % to 20.0 wt % of ethylene derived units, based upon the total weight of the second copolymer; and
      (ii) having a MFR (measured at 190° C. 2.16 kg of load) comprised between 0.5 g/10 min and 5.0 g/10 min;
   wherein
   (a) the resulting polyolefin composition has an melt flow rate (230° C./5 kg ISO 1133) ranging from about 0.2 g/10 min to about 4.0 g/10 min and
   (b) the sum A+B being 100.

2. The polyolefin composition of claim 1 wherein the content of ethylene derived units in component A) ranges from about 2.0 wt % to about 6.0 wt %.

3. The polyolefin composition of claim 1 wherein the content of ethylene derived units in component B) ranges from about 11 wt % to about 19 wt %.

4. The polyolefin composition of claim 1 wherein the melt flow rate (MFR) (230° C./5 kg ISO 1133) ranges from about 0.4 to about 3.0 g/10 min.

5. An article of manufacture comprising:
   a polyolefin composition comprising:
   A) from about 90.0 wt % to about 99.0 wt %, based upon the total weight of the polyolefin composition, of a first propylene ethylene copolymer wherein:
      i) the content of ethylene derived units is between about 1.0 wt % and 8.0 about wt %, based upon the total weight of the first copolymer;
      (ii) the melting temperature ranges from about 135° C. to about 155° C.;

(iii) the melt flow rate (230° C./5 kg ISO 1133) ranges from about 0.2 g/10 min to about 3.5 g/10 min;
(iv) the xylene solubles at 25° C. ranges from about 10.0 wt % to about 4.0 wt %, based upon the total weight of the first copolymer; and
(v) the polydispersity index, PI, ranges from about 3.0 to about 7.0; and B) from about 1.0 wt % to about 10.0 wt %, based upon the total weight of the polyolefin composition, of a second propylene ethylene copolymer:
(i) containing from 8.0 wt % to 20.0 wt % of ethylene derived units, based upon the total weight of the second copolymer; and
(ii) having a MFR (measured at 190° C. 2.16 kg of load) between about 0.5 g/10 min and about 5.0 g/10 min;

wherein
(a) the resulting polyolefin composition has a melt flow rate (230° C./5 kg ISO 1133) ranging from about 0.2 g/10 min to about 4.0 g/10 min and
(b) the sum A+B being 100.

6. The article of manufacture of claim 5, wherein the article is selected from the group consisting of pipes and sheets.

7. The article of manufacture of claim 5, wherein the article is a multilayer article wherein at least one layer comprises the polyolefin composition.

8. The article of manufacture of claim 6 is a pipe.

* * * * *

UNITED STATES PATENT AND TRADEMARK OFFICE
CERTIFICATE OF CORRECTION

PATENT NO. : 9,914,826 B2
APPLICATION NO. : 15/328845
DATED : March 13, 2018
INVENTOR(S) : Galvan et al.

It is certified that error appears in the above-identified patent and that said Letters Patent is hereby corrected as shown below:

On the Title Page
Column 2, item (56), Line 1, delete "Opinon" and insert -- Opinion --

In the Specification
In Column 5, Line 4, delete "CH2" and insert -- $CH_2$ --
In Column 5, Line 5, delete "C1-C6" and insert -- $C_1$-$C_6$ --
In Column 5, Line 10, delete "C4-C8" and insert -- $C_4$-$C_8$ --
In Column 5, Line 21, delete "C4-C8" and insert -- $C_4$-$C_8$ --
In Column 6, Line 31, delete "MgC12.nROH" and insert -- $MgCl_2$.nROH --
In Column 6, Line 34, delete "TiC14" and insert -- $TiCl_4$ --
In Column 6, Line 36, delete "TiC14," and insert -- $TiCl_4$, --
In Column 6, Line 61, delete "SO4" and insert -- $SO_4$ --
In Column 6, Line 61, delete "SO3" and insert -- $SO_3$ --
In Column 7, Line 2, delete "(OCH3)2," and insert -- $(OCH_3)_2$, --
In Column 7, Line 2, delete "(OCH3)2," and insert -- $(OCH_3)_2$, --
In Column 7, Line 3, delete "2Si(OCH3)2" and insert -- $2Si(OCH_3)_2$ --
In Column 7, Line 3, delete "(phenyl)2Si(OCH3)2" and insert -- $(phenyl)2Si(OCH_3)_2$ --
In Column 7, Line 4, delete "(OCH3)3." and insert -- $(OCH_3)_3$. --
In Column 7, Line 11, delete "2Si(OCH3)2" and insert -- $2Si(OCH_3)_2$ --
In Column 7, Line 24, delete "the the" and insert -- the --
In Column 9, Line 2, delete "(CH2" and insert -- $(CH_2$ --
In Column 9, Line 6, after "527" insert -- . --
In Column 9, Line 8, after "180" insert -- . --

In the Claims
In Column 10, Line 49, Claim 2, after "1" insert -- , --
In Column 10, Line 52, Claim 3, after "1" insert -- , --
In Column 10, Line 55, Claim 4, after "1" insert -- , --
In Column 11, Line 29, Claim 8, after "6" insert -- , --

Signed and Sealed this
Twenty-first Day of December, 2021

Drew Hirshfeld
*Performing the Functions and Duties of the*
*Under Secretary of Commerce for Intellectual Property and*
*Director of the United States Patent and Trademark Office*